United States Patent [19]

Chang et al.

[11] 3,954,899
[45] May 4, 1976

[54] EXTENSIBLE COATINGS
[75] Inventors: Wen-Hsuan Chang, Gibsonia; Marvis E. Hartman, Pittsburgh, both of Pa.
[73] Assignee: PPG Industries, Inc., Pittsburgh, Pa.
[22] Filed: Apr. 11, 1975
[21] Appl. No.: 567,219

Related U.S. Application Data
[63] Continuation-in-part of Ser. No. 347,022, April 2, 1973, abandoned, which is a continuation-in-part of Ser. No. 828,337, May 27, 1969, abandoned.

[52] U.S. Cl. .......................... 260/849; 260/2.5 AT; 260/42.29; 260/75 NK; 260/850; 260/856; 428/121; 428/256; 428/268
[51] Int. Cl.² ................... C08L 61/20; C08L 61/26
[58] Field of Search ............... 260/849, 850, 75 NC, 260/856

[56] References Cited
UNITED STATES PATENTS

| | | | |
|---|---|---|---|
| 2,625,535 | 1/1953 | Mastin et al. | 260/75 TN |
| 2,850,474 | 9/1958 | Maxey | 260/850 |
| 3,148,173 | 9/1964 | Axelrood | 260/850 |
| 3,368,988 | 2/1968 | Sekmakas | 260/850 |
| 3,384,606 | 5/1968 | Dietrich et al. | 260/850 |
| 3,457,324 | 7/1969 | Sekmakas | 260/850 |
| 3,759,873 | 9/1973 | Hudak | 260/75 NK |

FOREIGN PATENTS OR APPLICATIONS

| | | | |
|---|---|---|---|
| 203,086 | 6/1955 | Australia | 260/850 |

*Primary Examiner*—Murray Tillman
*Assistant Examiner*—J. Ziegler
*Attorney, Agent, or Firm*—William J. Uhl; Carl T. Severini

[57] ABSTRACT

Cured coatings having a high degree of extensibility and other desirable properties are obtained from compositions comprising a hydroxyl-containing, urethane reaction product containing a polyester component and an amine-aldehyde resin. Preferred compositions contain a polymeric polyol of low glass transition temperature. These compositions are storage-stable in one package, and the cured coatings are adherent, durable and highly extensible. These coatings are particularly useful on resilient and rubbery substrates, such as form rubber, polyurethane foam and vinyl foam, and on soft metal surfaces such as mild steel and aluminum.

15 Claims, No Drawings

EXTENSIBLE COATINGS

CROSS-REFERENCE TO RELATED APPLICATIONS

This application is a continuation-in-part of application Ser. No. 347,022, filed Apr. 2, 1973, now abandoned, which in turn is a continuation of application Ser. No. 828,337, filed May 27, 1969, now abandoned.

BACKGROUND OF THE INVENTION

Recent advances in coating technology have provided coatings which are suitable for use over various substrates which are difficult to coat and having many different problems. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

Recently, there has been interest in the use of rubbery, resilient materials for areas which are subject to mechanical shock such as automobile bumpers and moldings, exposed corners and surfaces of industrial machines, kickplates and other areas of doors and entrances, and the like. The use of such materials aids in providing protection against permanent structural damage, but in order to attain the desired appearance a decorative and protective coating must be applied to the surface and this coating can also be applied to the surface and this coating can also be damaged during use. Conventional coatings, including those employed on rubber and similar extensible objects heretofore, do not have the required combination of properties. These necessary properties include:

1. Extensibility - This property is necessary in order that the advantages of the resilient substrate can be utilized without destruction of the integrity of the surface of the coating.
2. Tensile Strength - A high degree of tensile strength is also necessary in order to avoid rupture of the film during use.
3. Package Stability - In order to permit ease of application, the liquid coating composition should be stable for extended periods under ambient conditions without either gelation or depolymerization of the resin contained therein.
4. Film stability - Certain coatings which are extensible and which have a relatively high tensile strength lose these properties upon aging and particularly if the coating is exposed to sunlight, weathering, etc.
5. Impact resistance - The coating should have adequate impact resistance at various temperatures as encountered in extreme weather variations, including temperatures as low as −20°F. and as high as 120°F.
6. Adhesion - The coating should have satisfactory adhesion to the various substrates with which it is to be employed including extensible materials such as foams, rubber and the like, and metals such as mild steel. In addition the coatings should have satisfactory intercoat adhesion with succeeding coats or with various primers which can be employed.
7. Chemical and Humidity Resistance - This includes properties such as saponification resistance upon exposure to acids and alkalis, resistance to various solvents and resistance to atmospheres of high humidity and heat.
8. Resistance to Cracking under Temperature-Humidity Cycling - This property is important where the coating might be exposed to rapid variations in temperature and humidity as might be encountered by automobiles during travel or storage. This property is tested by successively exposing the coated object to conditions of high temperature and high humidity alternated with exposure to low temperature and low humidity.

Still other properties which are important for commercial applicability include sprayability at reasonable solids contents, non-toxicity, and low sensitivity to moisture.

It is especially difficult to obtain the above properties in combination since, in most instances, the obtention of one or several of the properties desired requires the use of materials and formulations which under ordinary circumstances tend to make the other desired properties less satisfactory.

SUMMARY OF THE INVENTION

The compositions of the present invention comprise (1) an ungelled, hydroxyl-containing urethane reaction product of an organic polyisocyanate and a polyhydric material comprising a major proportion of a substantially linear polyester, and (2) an amine-aldehyde resin. The polyester is formed from an alcohol component having an average functionality of at least about 1.9 and an acid component consisting essentially of one or more monomeric carboxylic acids or anhydrides containing 2 to 14 carbon atoms and also having an average functionality of at least about 1.9. To obtain the desired extensibility and other properties, the alcohols and acids or anhydrides used should contain a total of not more than about one gram-mole of compounds having a functionality of 3 or more per 500 grams of the total of the alcohols and acid or anhydride employed.

Such coatings can be applied to virtually any solid substrate and are especially useful on rubbery, resilient substrates such as polyurethane or polyethylene foam, natural or synthetic rubber or rubber foam, and various elastomeric plastic materials. They are also particularly useful on other substrates such as mild steel or aluminum.

These compositions, although based on a urethane system, are distinguished from ordinary polyurethanes because they are both storage-stable in one package and yet form a cross-linked thermoset cured coating.

The coatings herein provide all the above-mentioned properties to a satisfactory degree and have a combination of these properties not heretofore considered possible.

DETAILED DESCRIPTION OF THE INVENTION

The compositions of the invention contain as one component an isocyanate-modified resin containing hydroxyl groups and formed by reacting a polyhydric material comprising a substantially linear polyester polyol with an organic polyisocyanate. The isocyanate-modified resin is combined with an aminoplast resin to provide the coating composition of the invention.

It is necessary that the polyester polyol employed have certain properties in order to provide a coating of the desired characteristics. These properties are obtained in general by utilizing a polyester containing a polyol component having an average functionality of at least about 1.9. The polyol component in most cases consists essentially of one or more diols with up to about 25 mole percent of polyols present having 3 or more hydroxyl groups. While it is not always necessary to have a triol or higher polyol present, some branching is desirable, although the polyester should not be highly branched. There may also be present a small amount of monoalcohol, particularly if larger proportions of higher polyols are used. In certain instances, such as where very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, and neopentyl glycol, and other glycols such as hydrogenated bisphenol A, cyclohexane dimethanol, caprolactone diol (i.e., the reaction product of caprolactone and ethylene glycol), hydroxyalkylated bisphenols, polyether glycols, e.g. poly(oxytetramethylene) glycol, and the like. However, other diols of various types and, as indicated, polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such a higher molecular weight polyol is the reaction product of 20 moles of ethylene oxide per mole of trimethylolpropane.

The acid component of the polyester consists essentially of monomeric carboxylic acids or anhydrides having 2 to 14 carbon atoms per molecule. The acids should have an average functionality of at least about 1.9; the acid component in most instances contains at least about 75 mole percent of dicarboxylic acids or anhydrides. The functionality of the acid component is based upon considerations similar to those discussed above in connection with the alcohol component, the total functionality of the system being kept in mind.

Among the acids which are useful are phthalic acid, isophthalic acid, terephthalic acid, tetrahydrophthalic acid, hexahydrophthalic acid, adipic acid, azelaic acid, sebacic acid, malic acid, glutaric acid, chlorendic acid, tetrachlorophthalic acid, and other dicarboxylic acids of varying types. The polyester may include minor amounts of monobasic acid, such as benzoic acid, and also there can be employed higher polycarboxylic acids, such as trimelletic acid and tricarballylic acid where acids are referred to above it is understood that the anhydrides of those acids which form anhydrides can be used in place of the acid). It is preferred that the polyester include an aliphatic dicaboxylic acid as at least part of the acid component.

As mentioned, the overall functionality per unit weight of the reaction system is important. There should not be present more than about one gram-mole of acids and/or alcohols having a functionality of 3 or more, per 500 grams of the total weight of these compounds. By "functionality" is meant the number of reactive hydroxyl and carboxyl groups per molecule, with anhydride groups being considered as equivalent to two carboxyl groups. It can be noted that certain compounds contain both hydroxyl and carboxyl groups; examples are 6-hydroxyhexanoic acid, 8-hydroxyoctanoic acid, tartaric acid, etc.

The polyester is produced using conventional techniques, with the reaction conditions and the ratio of reactants chosen so as to provide a product having residual hydroxyl groups, i.e., a polyester polyol. The number of hydroxyls present in the product can be varied, but it is preferred that its hydroxyl value be at least about 30 and preferably more than 80.

The polyester polyol as described provides the major proportion of the polyhydric material and be the entire polyhydric component utilized. However, in many instances, other hydroxyl-containing compounds are used, such as polyether polyols of the various typs known in the art; monomeric polyols, especially diols, such as 1,4-butanediol, neopentyl glycol, and the like; monohydric alcohols; and polyfunctional compounds containing one or more hydroxyls, such as ethanolamine.

The organic polyisocyanate which is reacted with the polyhydric material as described is essentially any polyisocyanate, e.g. hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'biphenylene diisocyanate, 1,4-tetramethylene diisocyanate, hexamethylene diisocyanate, 2,2,4-trimethylhexane-1,6 diisocyanate, methylene bis(phenyl isocyanate), lysine diisocyanate, bis(isocyanatoethyl) fumarate, isophorone diisocyanate and methyl cyclohexyl diisocyanate. There can also be employed isocyanate-terminated adducts of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate and methylcyclohexyl diisocyanate. The proportions of the diisocyanate and the polyester are chosen so as to provide a hydroxyl-containing product. This can be accomplished by utilizing a less than stoichiometric amount of polyisocyanate, i.e. less than one isocyanate group per hydroxyl and carboxyl group in the polyester. Higher (e.g. stoichiometric or excess) isocyanate levels can be present if the reaction is terminated at the desired stage, as by addition of a compound which reacts with the residual isocyanate groups; water, alcohols and amines are examples of such compounds.

In one especially desirable embodiment of the invention, a polyfunctional alcohol is used to terminate the reaction at the desired stage (determined by the viscosity), thereby also contributing residual hydroxyl groups. Particularly desirable for such purposes are aminoalcohols, such as ethanolamine, diethanolamine and the like, since the amino groups preferentially react with the isocyanate groups present. Polyols, such as ethylene glycol, trimethylolpropane and hydroxylterminated polyesters, can also be employed in this manner.

While the ratios of the components of the polyester, the polyisocyanate and any terminating or blocking agent can be varied, it will be noted by those skilled in the art that the amounts should be chosen so as to avoid gellation and to produce an ungelled, urethane reaction product containing hydroxyl groups. The hydroxyl value of the urethane reaction product should be at least 10 and preferably 20 to about 200.

The urethane reaction product as described above is mixed with an aminoplast resin to provide the coating composition. Aminoplast resins are aldehyde condensation products of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrmidine, 2,4,6-triethyl triamino-1,3,5-triazine, and the like.

While the aldehyde employed is most often formaldehyde, other similar condensation products can be made from other aldehydes, such as acetaldehyde, crotonaldehyde acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, hepanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol. The preferred amine-aldehyde resins are etherified with methanol or butanol.

For optimum properties, it is preferred to include in the composition a polymeric polyol having a low glass transition temperature, i.e., having a glass transition temperature below about 25°C. The inclusion of such a polymeric polyol gives a balance of flexibility and hardness. Among the preferred polymeric polyols are polyether polyols; especially preferred are poly(oxyalkylene) glycols such as polyethylene glycol, polypropylene glycol, and other such glycols having up to about 6 carbon atoms separating each pair of oxygen atoms. A specific preferred polyol is poly(oxytetramethylene)glycol. Other highly desirable polymeric polyols are polyester polyols having the desired glass transition temperature, especially those produced from acyclic reactants such as adipic acid and azelaic acid and alkylene glycols; poly(neopentyl adipate) is a useful example. Still other polymeric polyols of suitable properties include condensates of lactones with polyols, such as the product from caprolactone and ethylene glycol, propylene glycol, trimethylolpropane, etc.

The polymeric polyol can be incorporated into the composition in various ways. In some instances the polyester polyol employed can serve as the polymeric polyol, but this does not usually provide a coating of suitable hardness. More usually, the "soft" polymeric polyol is used in conjunction with a polyester polyol (or constituent thereof) having a higher glass transition temperature. One method is to include the polymeric polyol in the polyester as part of the polyol component; another way is to produce an isocyanato-terminated adduct or prepolymer from the polymeric polyol and the polyisocyanate; a third method is to blend the polymeric polyol as such with the polyester, before or after the polyester is reacted with the polyisocyanate. The choice of method depends upon the particular components used and the properties desired, but in each instance the product contains both "hard" and "soft" segments in a type of block copolymer.

The proportions of the above components can be varied to provide certain properties. For example, higher levels of polymeric polyol result in somewhat softer and more extensible coatings, whereas harder, more resistant coatings are obtained by increasing the proportion of aminoplast resin. The amounts employed depend in large part upon the nature of the particular components, e.g., the specific polyester, aminoplast resin, as well as the type of polymeric polyol, if any, employed. In most cases the overall composition contains from about 50 to about 95 percent by weight of urethane reaction product, and from about 5 to about 50 percent of aminoplast resin. The preferred compositions in which a polymeric polyol is included contain from about 45 to about 90 percent by weight of urethane reaction product, from about 5 to about 40 percent by weight of aminoplast resin, and from about 2 to about 20 percent by weight of polymeric polyol.

In addition to the components above, the compositions ordinarily contain other optional ingredients, including various pigments; and of the pigments ordinarily utilized in coatings of this general class can be used. In addition, various fillers, plasticizers, antioxidants, flow control agents, surfactants and other such formulating additives are employed in many instances. The composition is ordinarily contained in a solvent, which can be any solvent or solvent mixture in which the materials employed are compatible and soluble to the desired extent.

The compositions herein can be applied by any conventional method, including brushing, dipping, flow coating, etc., but they are most often applied by spraying. Usual spray techniques and equipment are utilized. They can be applied over virtually any substrate, including wood, metals, glass, cloth, plastics, foams, and the like, as well as over various primers.

The coatings are cured at elevated temperatures. In most cases the cure schedule is from about 20 to about 40 minutes at 140°F. to 260°F. Higher or lower temperatures with correspondingly shorter and lower times can be utilized, although the exact cure schedule best employed depends in part upon the nature of the substrate as well as the particular components of the composition. Acid catalysts and other curing catalysts can be added to aid in curing if desired; these can permit the use of lower temperatures and/or shorter times.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE 1

The following were charged to a reaction vessel:

| | Parts by Weight |
|---|---|
| Neopentyl glycol | 126.9 |
| Trimethylolpropane | 22.1 |
| Adipic acid | 72.3 |
| Isophthalic acid | 123.2 |

This mixture was heated to 200°C. for 30 minutes and then at 220°C. until the resin had a Gardner-Holdt viscosity of F (60 percent solids in methyl ethyl ketone), and acid value of about 10 and a hydroxyl value of about 100. This polyester polyol was then mixed with the following:

| | Parts by Weight |
|---|---|
| Polyester | 70 |
| Methyl ethyl ketone | 35 |
| Methane-bis(cyclohexyl isocyanate)* | 7.13 |

*Mobay D-244

This mixture was heated at 150°F. for 20 hours and then cooled to 120°F. for 3 more hours. There were then added 22 parts of n-butanol and 0.3 part of ethanolamine. The product had a Gardner-Holdt viscosity of Z1-Z2, a non-volatile solids content of about 60 percent and an acid value of 3.7.

A gray coating composition was formulated using the urethane reaction product thus produced by blending the following.

| | Parts by Weight |
|---|---|
| Urethane reaction product | 196.5 |
| Hexakis(methoxymethyl)melamine ("Cymel 301") | 18.7 |
| Poly(oxytetramethylene) glycol | 15.8 |
| CAB solution* | 7.5 |
| Pigment paste | 67.5 |
| Toluene | 217.5 |
| Cellosolve acetate | 49.5 |
| Ethyl Cellosolve | 99 |
| Diacetone alcohol | 74.5 |
| p-Toluene sulfonic acid | 1.5 |

*20 percent solution of ½ second cellulose acetate butyrate in 80/20 toluene/ethanol The pigment paste employed was ground in a solution of a polyester made from 146 parts of neopentyl glycol, 112 parts of adipic acid, 191 parts of isophthalic acid and 103 parts of trimethylolpropane; the paste was produced by mixing the following:

| | Parts by Weight |
|---|---|
| Polyester (60 percent solids in xylene) | 89 |
| TiO₂ | 260 |
| Molacco black | 13 |
| Xylene | 28 |
| Methyl isobutyl ketone | 43.5 |
| Butanol | 10.5 |

This mixture was ground in a ball mill until the particles had a fineness of 6½ Hegman and then 50 parts of toluene were added.

The coating composition thus obtained had good storage stability and excellent properties. For example, when baked at 250°F. for 60 minutes it provided a film having outstanding extensibility (maximum elongation 181 percent) and tensile strength (2.09 × 10$^5$ g/cm$^2$, measured on Instron Tester). When coated on polyurethane foam of the type employed for automobile bumpers (having a density of 40 pounds per cubic foot and a Shore "A" hardness of 78), it had desirable properties, including impact resistance in excess of 160 inch/lbs (measured on a Gardner Variable Impact Tester). This composition is suitable as a primer over such foams and similar materials.

EXAMPLE 2

A white coating composition was produced using the urethane reaction product described in Example 1 and a pigment paste made in a manner similar to that described in Example 1 but without carbon black; the pigment contained 61.5 percent TiO$_2$ and 12 percent of polyester along with suitable solvents. The coating composition had the following constituents:

| | Parts by Weight |
|---|---|
| Urethane reaction product | 74 |
| Hexakis(methoxymethyl)melamine ("Cymel 301") | 10 |
| Pigment paste | 40 |
| Poly(oxytetramethylene glycol) (mol. wt. 1000) | 6 |
| CAB solution (as in Example 1) | 5 |
| p-Toluene sulfonic acid | 0.5 |
| Methyl ethyl ketone | 100 |
| Cellosolve acetate | 50 |

Films of this composition (baked 60 minutes at 250°F.) had a maximum elongation of 177 percent and tensile strength of 1.55 × 10$^5$ g/cm$^2$. When coated over the primed foam produced in Example 1, it provided a coated product of outstanding properties including good impact resistance.

EXAMPLE 3

A coating composition was produced as in Example 1 except that the aminoplast resin utilized was a more resinous, less highly methylated melamine-formaldehyde resin known as "OR-483". The product had properties substantially similar to that from Example 1.

EXAMPLE 4

Following the procedure of Example 1, a coating composition was produced using the urethane reaction product and pigment paste described therein, but with a butylated melamine-formaldehyde resin made using 5.5 moles of formaldehyde and 6 moles of butanol per mole of melamine; the resin was a 60 percent solids solution in 25/75 butanol/xylene. The coating composition contained the following:

| | Parts by Weight |
|---|---|
| Urethane reaction product | 110 |
| Butylated melamine resin | 42 |
| Poly(oxytetramethylene)glycol (mol. wt. 1000) | 10.5 |
| Pigment paste | 45 |
| CAB solution (as in Example 1) | 5 |
| Xylene | 130 |
| Cellosolve acetate | 40 |
| Ethyl Cellosolve | 80 |
| Diacetone alcohol | 50 |
| p-Toluene sulfonic acid | 2 |

This composition produced extensible films of somewhat lower maximum elongation than those above but with good tensile strength (2.65 × 10$^5$ g/cm$^2$). When coated over foam as in Example 1, the coating had good impact resistance and other properties.

EXAMPLE 5

A polyester containing poly(oxytetramethylene)-glycol in the polyester molecule was produced from the following:

| | Parts by Weight |
|---|---|
| Neopentyl glycol | 4875 |
| Adipic acid | 3014 |
| Isophthalic acid | 5132 |
| Trimethylolpropane | 921 |
| Poly(oxytetramethylene glycol) (mo. wt. 1000) | 3750 |

The polyester produced had an acid value of 5.9 and a hydroxyl value of 59. It was reacted with the following:

| | Parts by Weight |
|---|---|
| Polyester | 1800 |
| Methyl isobutyl ketone | 1080 |
| Methane-bis(cyclohexyl isocyanate)* | 168 |

*"Hylene W"

This mixture was heated at 150°F. for 6½ hours; to 2605 parts of the product there were added 3.9 parts of ethanolamine and 520 parts of butanol. The product had a Gardner-Holdt viscosity of Z3 and contained 51.2 percent non-volatile solids. This urethane reaction product was formulated into a coating composition as follows:

| | Parts by Weight |
|---|---|
| Urethane reaction product | 76 |
| Hexakis(methoxymethyl)melamine ("Cymel 301") | 7.5 |
| Pigment paste (as in Example 2) | 37 |
| CAB solution (as in Example 1) | 5 |
| Cellosolve acetate | 60 |
| Methyl ethyl ketone | 30 |
| Toluene | 80 |
| p-Toluene sulfonic acid | 0.75 |

Films of this composition, baked 30 minutes at 250°F. had excellent extensibility (187 percent maximum elongation) and tensile strength (1.86 × 10⁵ g/cm²). When employed as a topcoat (as in Example 2) coatings of good overall properties were obtained.

In a similar manner, coating compositions of desirable properties are produced using other polyesters of the class described, as well as other polyisocyanates, such as toluene diisocyanate, in place of the polyesters and polyisocyanates in the examples. Also, while the examples show the inclusion of poly(oxytetramethylene)glycol, other polymeric polyols having low glass transition temperatures can be used instead; such polyols include, for instance, other polyether polyols and the polyester polyols as described. Furthermore, while the inclusion of such a polyol is usually desirable for obtention of properties as described, it can be omitted where a lesser degree of extensibility is required.

EXAMPLE 6

A water-dilutable, hydroxyl-containing urethane reaction product was prepared according to the invention as follows:

To a clean reaction vessel under a nitrogen blanket were charged the following:

| | Parts by Weight |
|---|---|
| Polyester diol¹ | 4690 |
| 4,4'-Bis-(cyclohexyl isocyanate) (HYLENE W) | 2645 |
| Methyl-n-butyl ketone | 2000 |
| Dibutyltin dilaurate | 0.08 |

¹2345 parts of polycaprolactone diol (1250 molecular weight) prepared from reaction of epsilon-caprolactone with diethylene glycol, commercially available from Union Carbide Corporation as PCP 0230, and 2345 parts of 1,6-hexanediol adipate (1000 molecular weight) commercially available from Witco Chemical Company as FORMREZ L4-55.

The mixture was stirred and heated at 110°C. for one hour, at which time the following were added:

| | Parts by Weight |
|---|---|
| Ester of neopentyl glycol and hydroxypivalic acid (Ester Diol 204) | 410 |
| Trimethylol propane | 361 |
| Dimethylol propionic acid | 281 |
| Methyl-n-butyl ketone | 267 |
| Methyl isobutyl ketone | 194 |

The reaction mixture was heated to 100°C. and after 2 hours at 100°C., 90 parts by weight of HYLENE W and 38 parts by weight of triethylene diamine were added. The resin was kept at 90°C. until a Gardner viscosity of 70–80 seconds is reached, when the reaction was terminated by the addition of 46.5 parts of monoethanolamine and 264.5 parts of polycaprolactone triol (PCP 0301) having a molecular weight of 300 and prepared from ring opening epsilon-caprolactone with trimethylol propane.

The mixture was held at 90°C. for 30 minutes and 98.5 parts of hydroxyethyl ethylene imine were added and the temperature raised to 100°C. and held for 1 hour. Finally, 21.08 parts by weight of isopropyl alcohol and 702 parts by weight of n-butyl alcohol were added to thin the reaction mixture. The final resinous product had an acid value of 3.6, an OH value of 73.2 (at 100 percent total solids), a solids content of 47.1 percent, and a Gardner-Holdt viscosity of Y-Z.

The urethane reaction product prepared as described above was then employed in a water-dispersed coating composition by first neutralizing by mixing 10,000 parts of the urethane reaction product with 38 parts of dimethyl ethanolamine and 3000 parts of distilled water (80 percent of the total theoretical neutralization). The aqueous dispersion was then steam distilled to remove the organic solvent. The resultant dispersion had an acid value of 4.2, a pH of 8.47 and contained 38.7 percent total solids. The Brookfield viscosity of the material at 23°C. and 20 revolutions per minute was 2800 centipoises and at 23°C. and 100 revolutions per minute was 1200 centipoises.

Twenty-five (25) percent by weight (total resin solids) of a methylated melamine-formaldehyde curing agent (sold commercially by Rohm and Haas as MM83) was added to the water-dispersed urethane reaction product prepared as described above to form a crosslinkable coating composition. The composition was deposited as a film on a cold rolled steel panel by drawing down with a 3-mil draw bar and cured at 250°F. for 30 minutes to produce a crosslinked coating which had excellent impact resistance, extensibility and tensile strength. The impact resistance was greater than 160 inch-pounds as measured on a Gardner Variable Impact Tester. The crosslinked film had a maximum elongation of 185 percent and tensile strength of 3000 psi.

EXAMPLE 7

A water-dilutable poly(ester-urethane) polyol was prepared according to the invention as follows:

A polyester diol was prepared from the following charge:

|  | Parts by Weight |
| --- | --- |
| Neopentyl glycol | 6912 |
| Adipic acid | 3936 |
| Trimethylol propane | 1207 |
| Isophthalic acid (95 percent purity) | 6720 |
| Dibutyltin oxide | 169 |

The ingredients were heated, first to about 150°C. to initiate reaction, and as reaction continued under a nitrogen sparge to help remove water, the temperature was raised to about 210°C. to remove water. The resultant polyester had an acid value of 21.5, a hydroxyl value (at 100 percent total solids) of 85.4 and contained 98.7 percent total solids.

To a clean reaction vessel under a nitrogen blanket was charged the following:

|  | Parts by Weight |
| --- | --- |
| Polyester diol (prepared above) | 700 |
| Methyl ethyl ketone | 400 |
| 4,4'-Bis-(cyclohexyl isocyanate) (HYLENE W) | 1038 |
| Methyl ethyl ketone | 300 |

The charge was heated to 65°C. and reaction continued for about three hours until a Gardner-Holdt viscosity of 40.0 seconds was reached, at which time the reaction was terminated by adding 55 parts of monoethanolamine, 795 parts of isopropyl alcohol and 285 parts of n-butyl alcohol. After cooling to room temperature, the resultant product had an acid value of 11.5, a Gardner-Holdt viscosity of Y and contained 60.6 percent total solids.

The urethane reaction product prepared as described above was neutralized with dimethyl ethanolamine and dispersed in water by mixing 10,400 parts of the urethane reaction product with 145 parts of dimethyl ethanolamine in 2000 parts of deionized water. After steam distillation to remove organic solvent, the resultant neutralized dispersed urethane reaction product had an acid value of 8.6, a pH of 8.4 and contained 39.3 percent total solids. The material had a Brookfield viscosity at 23°C. and 20 revolutions per minute of 1000 centipoises and at 23°C. and 100 revolutions per minute a viscosity of 4000 centipoises.

Twenty-five (25) percent by weight (total resin solids) of a methylated melamine-formaldehyde curing agent MM83) was added to the water-dispersed urethane reaction product prepared as described above to form a crosslinkable coating composition which is stable for over 6 months at ambient temperature. The composition was deposited as a film on a cold rolled steel panel by drawing down with a 3-mil draw bar. The film was cured at 250°F. for 30 minutes to produce a crosslinked, hard, flexible coating which had a Sward Hardness of 46 and a Gardner impact resistance of greater than 160 inch-pounds as measured on a Gardner Variable Impact Tester.

According to the provisions of the patent statutes, there are described above the invention and what are now considered to be its best embodiments. However, within the scope of the appended claims, it is to be understood that the invention can be practiced otherwise than as specifically described.

We claim:
1. A one-package, storage stable coating composition consisting essentially of:
   an ungelled hydroxyl-containing urethane reaction product of an organic polyisocyanate and a polyhydric material, wherein a major portion of said polyhydric material is a saturated polyester polyol formed from:
   1. an alcohol component having an average functionality of at least about 1.9, and
   2. a saturated acid component consisting essentially of one or more monomeric carboxylic acids or anhydrides having 2 to 14 carbon atoms per molecule, said acid component having an average functionality of at least about 1.9;
   said polyhydric material containing a total of not more than one gram-mole of compounds having a functionality of 3 or more per 500 grams of polyhydric material; said urethane reaction product having a hydroxyl value of at least 10; and,
   B. an amine-aldehyde condensate.
2. The composition of claim 1, in which said urethane reaction product has a hydroxyl value of between about 20 and about 200.
3. The composition of claim 1, which includes as an additional component, a polymeric polyol having a glass transition temperature below about 25°C.
4. The composition of claim 3, in which said polymeric polyol is included in the polyol component of the polyester polyol.
5. The composition of claim 3, in which said polymeric polyol is reacted with said organic polyisocyanate.
6. The composition of claim 3 in which said polymeric polyol is blended with said urethane reaction product and said amine-aldehyde condensate.
7. The composition of claim 3 in which said polymeric polyol is a poly(oxyalkylene)glycol.
8. The composition of claim 7 in which said poly(oxyalkylene)glycol is poly(oxytetramethylene)glycol.
9. The composition of claim 3 in which said polymeric polyol is a polyester polyol.
10. The composition of claim 9 in which said polyester polyol is the reaction product of adipic acid and neopentyl glycol.
11. The composition of claim 1 in which said polyester polyol has a hydroxyl value of at least about 30.
12. The composition of claim 1 in which the ratio of isocyanate groups to reactive hydroxyl and carboxyl groups is less than 1 to 1.
13. The composition of claim 1 in which a polyfunctional alcohol is added to the product of a reaction between said organic polyisocyanate and said polyhydric material.
14. The composition of claim 13 in which said polyfunctional alcohol is an aminoalcohol.
15. The composition of claim 1 in which said aminealdehyde condensate is an alkylated condensation product of formaldehyde and melamine, urea or ben-

* * * * *

UNITED STATES PATENT OFFICE
CERTIFICATE OF CORRECTION

PATENT NO. : 3,954,899
DATED : May 4, 1976
INVENTOR(S) : Wen-Hsuan Chang and Marvis E. Hartman It is certified that error appears in the above-identified patent and that said Letters Patent are hereby corrected as shown below:

Column 6, line 34, "and" should be --any--.

Column 8, line 41, "OR-483" should be -- QR-483 --.

Column 12, last line, "ben-" should be --benzoguanamine--.

Signed and Sealed this

Twenty-first Day of September 1976

[SEAL]

Attest:

RUTH C. MASON
*Attesting Officer*

C. MARSHALL DANN
*Commissioner of Patents and Trademarks*